United States Patent
Kameshima

(10) Patent No.: US 11,137,503 B2
(45) Date of Patent: Oct. 5, 2021

(54) OPTICAL ELEMENT FOR A RADIATION IMAGING APPARATUS, RADIATION IMAGING APPARATUS, AND X-RAY IMAGING APPARATUS

(71) Applicant: RIKEN, Saitama (JP)

(72) Inventor: Takashi Kameshima, Saitama (JP)

(73) Assignee: RIKEN, Saitama (JP)

( * ) Notice: Subject to any disclaimer, the term of this patent is extended or adjusted under 35 U.S.C. 154(b) by 0 days.

(21) Appl. No.: 16/630,555

(22) PCT Filed: Jul. 19, 2018

(86) PCT No.: PCT/JP2018/027073
§ 371 (c)(1),
(2) Date: Jan. 13, 2020

(87) PCT Pub. No.: WO2019/017425
PCT Pub. Date: Jan. 24, 2019

(65) Prior Publication Data
US 2021/0088677 A1 Mar. 25, 2021

(30) Foreign Application Priority Data
Jul. 20, 2017 (JP) .............................. JP2017-141073

(51) Int. Cl.
*G01T 1/20* (2006.01)
(52) U.S. Cl.
CPC .......... *G01T 1/2002* (2013.01); *G01T 1/2018* (2013.01)

(58) Field of Classification Search
CPC ........................... G01T 1/2002; G01T 1/2018
See application file for complete search history.

(56) References Cited

U.S. PATENT DOCUMENTS

| | | | |
|---|---|---|---|
| 6,528,796 B1 | 3/2003 | Kaifu et al. | |
| 9,110,292 B1 | 8/2015 | Twede et al. | |
| 2006/0192129 A1 | 8/2006 | Yun et al. | |
| 2011/0155917 A1* | 6/2011 | Nomura | G01T 1/20 250/370.08 |
| 2011/0198503 A1* | 8/2011 | Koren | G01T 1/20 250/362 |
| 2012/0294416 A1 | 11/2012 | Ashokan et al. | |

(Continued)

FOREIGN PATENT DOCUMENTS

| | | |
|---|---|---|
| JP | 2001-074847 A | 3/2001 |
| JP | 2006-162293 A | 6/2006 |

(Continued)

OTHER PUBLICATIONS

International Search Report issued in corresponding International Application No. PCT/JP2018/027073 dated Oct. 16, 2018 (5 pages).

(Continued)

*Primary Examiner* — Kiho Kim
(74) *Attorney, Agent, or Firm* — Osha Bergman Watanabe & Burton LLP

(57) ABSTRACT

An optical element for a radiation imaging apparatus includes an objective lens and receives incident radiation. A scintillator that receives the radiation to emit fluorescence light with a longer wavelength than the radiation is formed unitarily on a radiation incidence side substrate face of a lens-form substrate included in the objective lens.

12 Claims, 13 Drawing Sheets

(56) References Cited

U.S. PATENT DOCUMENTS

| | | | | |
|---|---|---|---|---|
| 2014/0064445 A1* | 3/2014 | Adler | ............... | G21K 7/00 |
| | | | | 378/43 |
| 2014/0145085 A1* | 5/2014 | Wu | ............... | G01T 1/2018 |
| | | | | 250/366 |
| 2016/0054456 A1* | 2/2016 | Lebrun | ............ | G01T 1/2018 |
| | | | | 250/366 |
| 2016/0061963 A1 | 3/2016 | Kameshima | | |
| 2017/0234992 A1* | 8/2017 | Miyazawa | ........ | H01L 27/14625 |
| | | | | 257/432 |

FOREIGN PATENT DOCUMENTS

| | | | |
|---|---|---|---|
| JP | 2007-024584 | A | 2/2007 |
| JP | 2009-222578 | A | 10/2009 |
| JP | 2012-159483 | A | 8/2012 |
| JP | 2012-242397 | A | 12/2012 |
| JP | 2016-045183 | A | 4/2016 |
| JP | 2016-223997 | A | 12/2016 |

OTHER PUBLICATIONS

Written Opinion issued in corresponding International Application No. PCT/JP2018/027073 dated Oct. 16, 2018 (4 pages).
Office Action issued in corresponding Japanese Patent Application No. JP 2017-141073 dated Dec. 15, 2020 (7 pages).

* cited by examiner

WORKING DISTANCE > 0

WORKING DISTANCE < 0

WORKING DISTANCE = $-t/2$

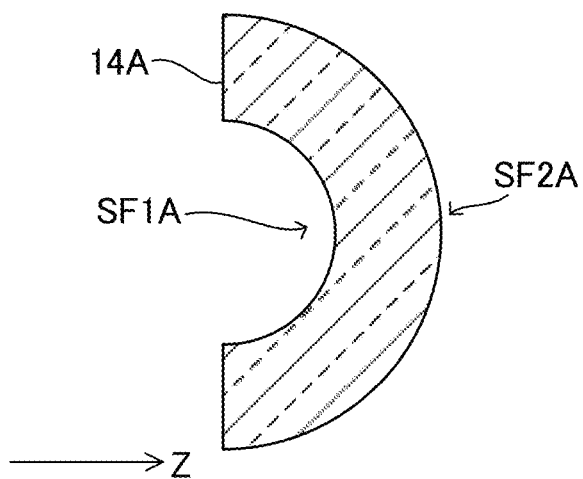
FIG.9A
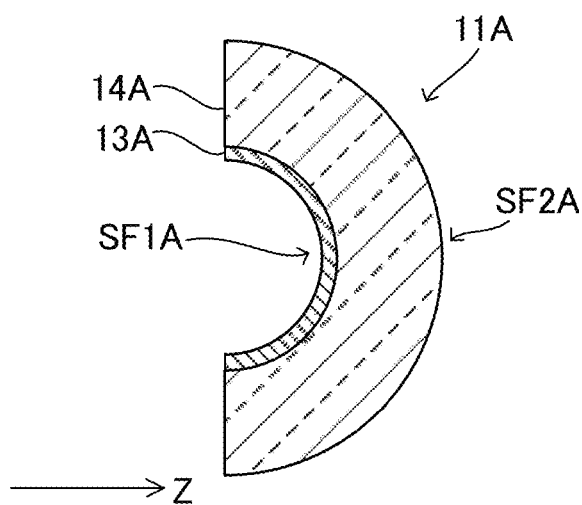
FIG.9B
FIG.10
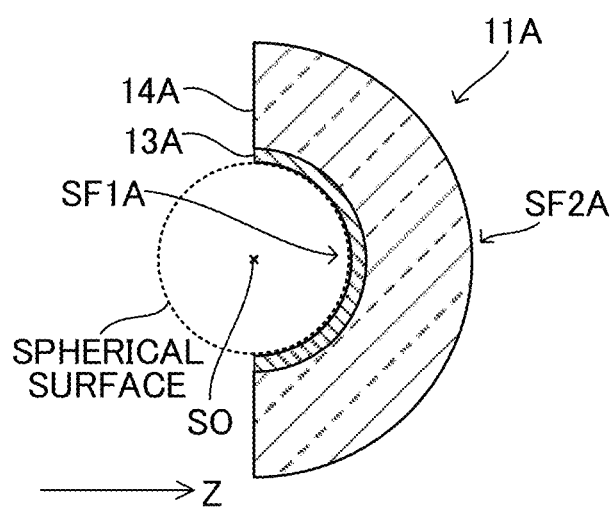

OPTICAL ELEMENT FOR A RADIATION IMAGING APPARATUS, RADIATION IMAGING APPARATUS, AND X-RAY IMAGING APPARATUS

TECHNICAL FIELD

The present invention relates to an optical element for a radiation imaging apparatus for use in, for example, a synchrotron radiation facility, and relates also to a radiation imaging apparatus and to an X-ray imaging apparatus.

BACKGROUND ART

A synchrotron radiation facility is a supersize X-ray light source that generates X rays with high directivity and high brightness, and is used as a powerful tool for observation and analysis in a variety of fields from material science to life science to fundamental physics. Making the most of its light source performance requires an X-ray detecting apparatus with high measurement accuracy combined with fast operation. In particular, an X-ray imaging apparatus that can sense X-ray signals across a wide range coincidentally is used as a highly versatile tool.

One aspect of the performance required in an X-ray imaging apparatus is spatial resolution. In an X-ray imaging apparatus, spatial resolution is a crucial parameter that determines the measurement limit, data quality, and the apparatus scale. Higher spatial resolution leads to higher sensing precision.

Known X-ray imaging apparatuses with spatial resolutions of 10 micrometers or less include an apparatus comprising a scintillator, an imaging optical system, and an image sensor.

FIG. 19 shows an outline configuration of an X-ray imaging apparatus employing a scintillator. In the X-ray imaging apparatus in FIG. 19, radiation, which is here X rays, is shone on a sample 910; the radiation that has passed through, or scattered on, the sample 910 is incident on a scintillator 901. The scintillator 901 converts the incident light, which is X rays, into fluorescence light with a longer wavelength that can be refracted with an optical lens. An image with the fluorescence light from the scintillator 901 is enlarged (or reduced as the case may be) by an imaging optical system 902, and is then projected onto an image sensor 903. In this way, information on the structure of the sample 910 is acquired with a predetermined spatial resolution.

The theoretical limit value of spatial resolution is, as with optical microscopes, given as a Rayleigh resolution limit. On an imaging apparatus employing a scintillator, spatial resolution is restricted by diffraction of scintillator fluorescence light, and the spatial resolution $\delta$ is given by $$\delta = 0.61 \times \lambda / NA.$$

Here, $\lambda$, represents the wavelength of the fluorescence light from the scintillator; NA represents the numerical aperture of the objective lens in the imaging optical system and is give by $$NA = n \cdot \sin \theta.$$

Here, n represents the index of refraction of the medium present between the objective lens and the scintillator; $\theta$ represents the angle of aperture, which refers to the maximum angle, relative to the optical axis, of the rays incident on the objective lens from the specimen (here, the scintillator), which is the target of observation.

FIG. 20 shows a comparison of a dry objective lens and a liquid-immersion objective lens, both usable on the X-ray imaging apparatus in FIG. 19.

When a dry objective lens is used, the medium between the objective lens and the scintillator is a gas (typically, air), or a vacuum is present between the objective lens and the scintillator. In these cases, the index of refraction n is approximately 1.0, and the angle of aperture $\theta$ is about 72 degrees at the maximum. Accordingly, when a dry objective lens is used, the numerical aperture NA is about 0.95 at the maximum, which corresponds to $1 \cdot \sin 72°$. When the wavelength of the fluorescence light from the scintillator is assumed to be 550 nm (nanometers), then with respect to the spatial resolution $\delta$, $0.61 \times 550 \times 10^{-9}/0.95 \approx 353 \times 10^{-9}$ gives 353 nm as the limit value.

When a liquid-immersion objective lens is used, the medium between the objective lens and the scintillator is oil with an index of refraction of about 1.52 or water with an index of refraction of about 1.33. Thus, compared with when a dry objective lens is used, refraction between the scintillator and the medium is smaller, and this permits collection of signals farther to the wide-angle side. The maximum value of the angle of aperture $\theta$ is about 72 degrees. Accordingly, when a liquid-immersion objective lens is used, the numerical aperture NA is 1.44 at the maximum, which corresponds to $1.52 \cdot \sin 72°$. When the wavelength of the fluorescence light of the scintillator is assumed to be 550 nm (nanometers), then with respect to the spatial resolution $\delta$, $0.61 \times 550 \times 10^{-9}/1.44 \approx 233 \times 10^{-9}$ gives 233 nm as the limit value.

With a view to attaining the Rayleigh resolution limit $\delta$, which is the theoretical limit value, a method of forming a scintillator thin film as well as a structure of such a scintillator thin film is disclosed that involves eliminating defocus components, that is, components that do not come into focus, and suppressing the scattering of light at the scintillator interface (see Patent Document 1 identified below). Also known is a technique of shaping a scintillator into the form of a lens to make the emergent light parallel (see Patent Document 2 identified below).

CITATION LIST

Patent Literature

Patent Document 1: Japanese Patent Application published as No. 2016-45183
Patent Document 2: Japanese Patent Application published as No. 2007-24584
Patent Document 3: Japanese Patent Application published as No. 2009-222578
Patent Document 4: Japanese Patent Application published as No. 2006-162293

SUMMARY OF INVENTION

Technical Problem

As discussed above, compared with using a liquid-immersion objective lens, using a dry objective lens leads to a higher spatial resolution $\delta$. However, a liquid-immersion objective lens has limited applications for reasons such as its tendency to go out of focus due to temperature-dependent variation of the index of refraction of the liquid part, the liquid's tendency to become opaque by clouding under radiation, and the difficulty holding the liquid in applications where the objective lens is arranged horizontally. Thus, a problem with radiation imaging apparatuses and the like is that, practically, spatial resolution can be no better than 353 nm as attained with a dry objective lens. While the above discussion of the background and related art focuses on X-ray imaging apparatuses in particular, similar circumstances apply to radiation imaging apparatuses in general.

An object of the present invention is to provide an optical element for a radiation imaging apparatus, a radiation imaging apparatus, and an X-ray imaging apparatus that contribute to enhancement of spatial resolution.

Solution to Problem

According to one aspect of the present invention, in an optical element for a radiation imaging apparatus that includes an objective lens and that receives incident radiation, a scintillator that receives the radiation to emit fluorescence light with a longer wavelength than the radiation is provided on the incidence side of the objective lens unitarily with the objective lens.

According to another aspect of the present invention, a radiation imaging apparatus includes an image sensor and an optical element for a radiation imaging apparatus as described above.

According to yet another aspect of the present invention, an X-ray imaging apparatus includes an image sensor, an optical element for a radiation imaging apparatus as described above, and an X-ray generating apparatus that generates X rays as the radiation that the optical element for a radiation imaging apparatus receives.

Advantageous Effects of Invention

According to the present invention, it is possible to provide an optical element for a radiation imaging apparatus, a radiation imaging apparatus, and an X-ray imaging apparatus that contribute to enhancement of spatial resolution

BRIEF DESCRIPTION OF DRAWINGS

FIGS. 9A and 9B are sectional views of a lens-form substrate and a front lens according to the second practical example of the present invention;

FIG. 10 is a diagram showing a spherical surface and its center related to the shape of the incidence face of a front lens in connection with the second practical example of the present invention;

DESCRIPTION OF EMBODIMENTS

Examples embodying the present invention will be described specifically below with reference to the accompanying drawings. Among the diagrams referred to, the same parts are identified by the same reference signs, and in principle no overlapping description of the same parts will be repeated. In the present description, for the sake of simple description, symbols and other designations referring to information, signals, physical quantities, components, and the like are occasionally used with the names of the corresponding information, signals, physical quantities, components, and the like omitted or abbreviated.

Figure 1:
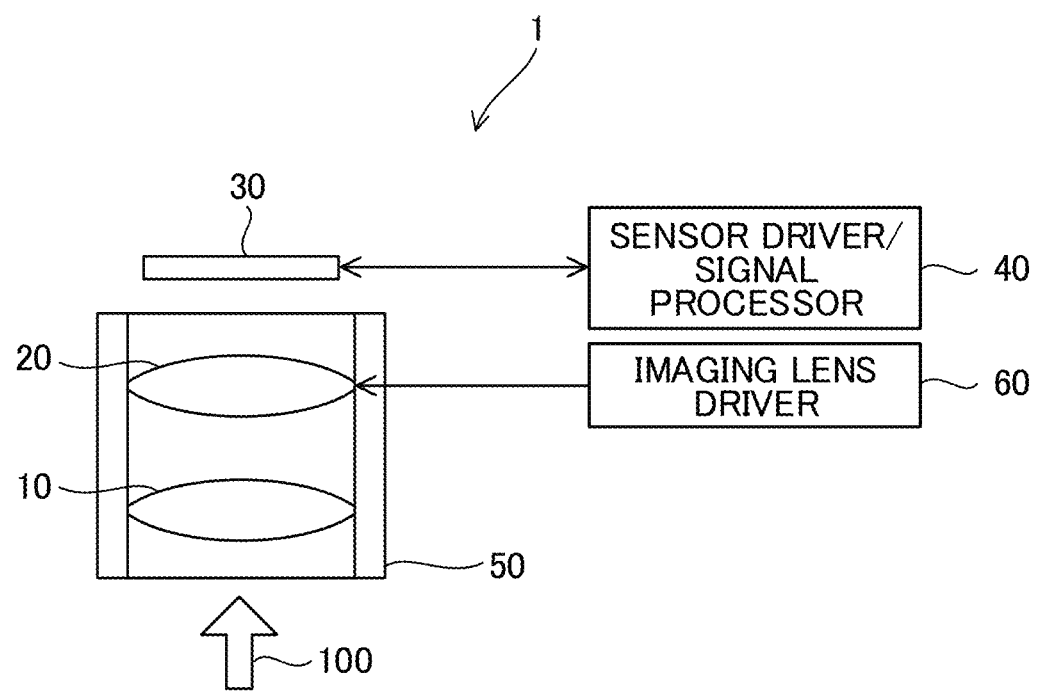
FIG. 1 is a diagram conceptually showing an overall configuration of an imaging apparatus according to an embodiment of the present invention

FIG. 1 is a diagram conceptually showing an overall configuration of an imaging apparatus 1 according to an embodiment of the present invention. The imaging apparatus 1 includes an objective lens 10, an imaging lens 20, an image sensor 30, a sensor driver/signal processor 40, a lens holder 50, and an imaging lens driver 60. The reference sign "100" indicates rays of light that are shone into the imaging apparatus 1.

The objective lens 10 and the imaging lens 20 constitute an imaging optical system. Incident rays 100 are first incident on the objective lens 10 among the lenses constituting the imaging optical system. The imaging optical system images an image based on the incident rays 100 on the imaging surface of the image sensor 30.

The image sensor 30 is a solid image sensing element comprising a CCD (charge-coupled device), CMOS (complementary metal-oxide-semiconductor), or other image sensor. In response to being fed with a sensor control signal, the image sensor 30 can output an image signal that conveys an image (optical image) imaged on the imaging surface.

The sensor driver/signal processor 40 feeds the image sensor 30 with a sensor control signal for driving and controlling the image sensor 30, and thereby acquires the above-mentioned image signal from the image sensor 30.

The lens holder 50 is a lens barrel that supports, at predetermined positions, the lenses, including the objective lens 10 and the imaging lens 20, constituting the imaging optical system. It is here assumed that all the lenses constituting the imaging optical system is supported by a single lens holder 50. Instead, the lens holder 50 may be composed of a plurality of lens holders. For example, the lens holder 50 may be composed of an objective lens holder that supports the objective lens 10 and an imaging lens holder that supports the imaging lens 20, and the objective lens holder and the imaging lens holder may be separate holders. A housing (not shown) that supports the imaging optical system and the image sensor 30 may be provided in the imaging apparatus 1.

The imaging lens driver 60 is a driving mechanism that moves the imaging lens 20 along the optical path of fluorescence light, which will be described later.

Figure 2:
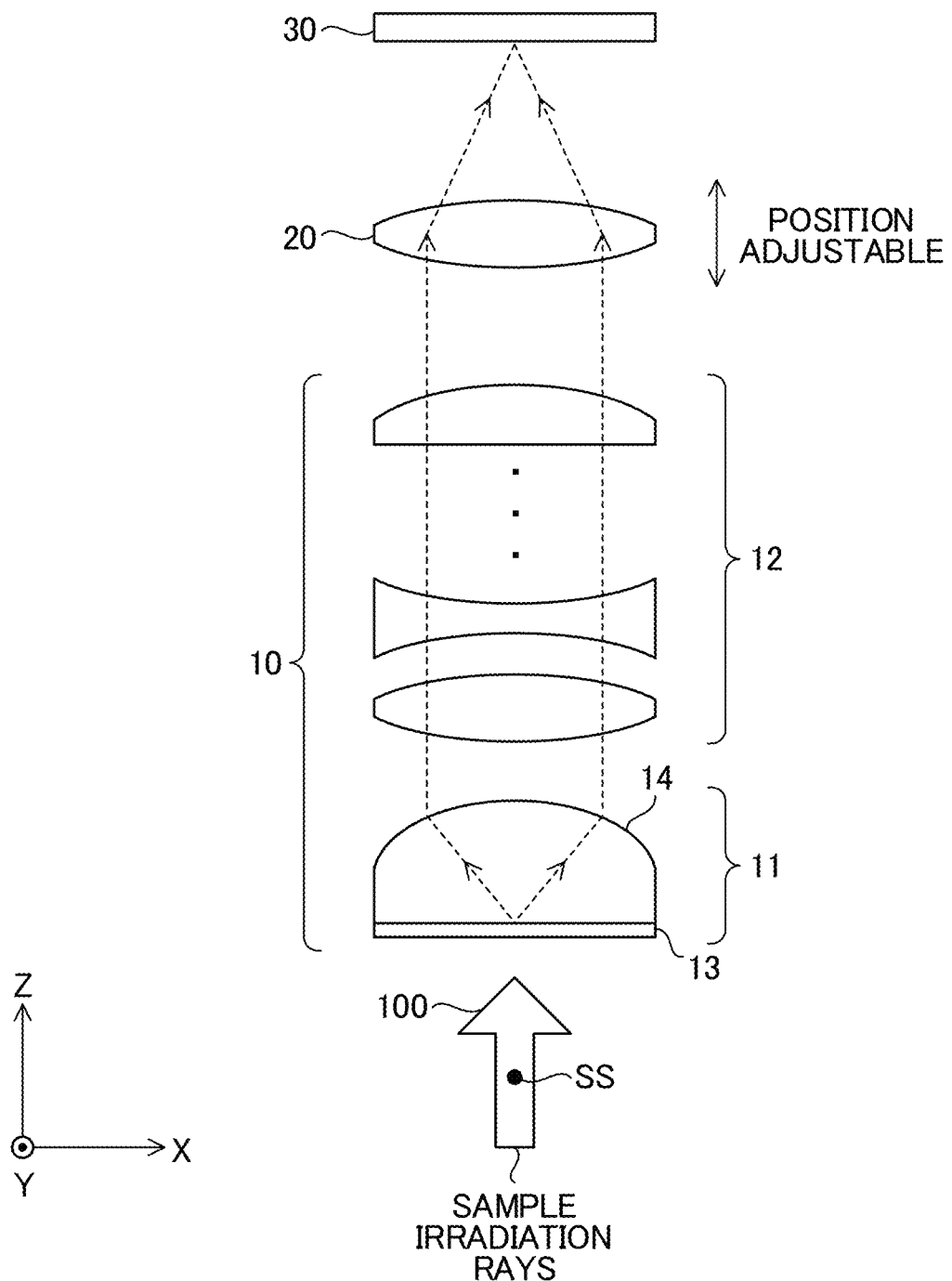
FIG. 2 is a diagram illustrating a structure of an imaging optical system according to an embodiment of the present invention.

With reference to FIG. 2, the structure of the imaging optical system including the objective lens 10 will now be described in detail. Sample irradiation rays such as X rays are shone on a sample SS, and the sample irradiation rays that have been transmitted through and scattered on the sample SS are, as incident rays 100, incident on the objective lens 10. The sample irradiation rays that have been transmitted through the sample SS refers to the sample irradiation rays that have been transmitted through the sample SS without being scattered by the sample SS. For the sake of concrete description, assume a three-dimensional rectangular coordinate system that is defined by three mutually perpendicular axes, namely the X, Y, and Z axes. The direction of travel of the sample irradiation rays that are shone on the sample SS is parallel to the Z axis. Accordingly, the direction of travel of the sample irradiation rays that have been transmitted through the sample SS also is parallel to the Z axis. The plane that is parallel to the X and Y axes will be referred to as the XY plane, the plane that is parallel to the Y and Z axes will be referred to as the YZ plane, and the plane that is parallel to the Z and X axes will be referred to as the ZX plane.

The objective lens 10 includes a front lens 11 and a non-front lens 12, that is, any lens other than the front lens 11. To keep the aberrations in the entire objective lens 10 small, the objective lens 10 is composed of a plurality of lenses. Of all the lenses constituting the objective lens 10, the front lens 11 is located closest to the position of incidence of the incident rays 100 (it is thus disposed at the position closest to the sample SS). That is, the front lens 11 is disposed closer to the position of incidence of the incident rays 100 than the non-front lens 12 is, and thus the incident rays 100 are incident on the front lens 11.

On the face of the front lens 11 closer to the position of incidence of the incident rays 100, a fluorescent film 13 is provided as a scintillator. It is here assumed that the fluorescent film 13 spreads on a plane perpendicular to the Z axis. That is, the fluorescent film 13 is assumed to be a planar film that spreads on the XY plane and that has a thickness in the Z-axis direction. In this embodiment, the scintillator formed on the surface of the front lens 11 has so small a thickness that it can be called a film, and accordingly the scintillator is referred to as the fluorescent film. In practice, the scintillator may have any thickness, and then can be referred to as a fluorescent member. Of the front lens 11, the part where the fluorescent film 13 is not formed is referred to as a lens-form substrate 14. There is no gap between the lens-form substrate 14 and the fluorescent film 13. It is also possible to understand that the lens-form substrate 14 has the fluorescent film 13 formed on its surface to receive the incident rays 100 at the fluorescent film 13.

Owing to the fluorescent film 13 being provided on the face of the front lens 11 closer to the position of incidence of the incident rays 100, the incident rays 100 traveling toward the objective lens 10 are incident on the fluorescent film 13. The sample irradiation rays and the incident rays 100 are rays of light with a predetermined wavelength WL1, and are, for example, gamma rays, X rays, or ultraviolet rays (for example, extreme ultraviolet in particular). The fluorescent film 13 is formed of a scintillator material that generates fluorescence light when it receives the incident rays 100. The wavelength WL2 of the fluorescence light is longer than the wavelength WL1, and the fluorescence light can be, typically, visible light. This, however, is not meant to exclude the fluorescence light emanating from the fluorescent film 13 being light in an ultraviolet spectrum. In the following description of this embodiment, whenever the fluorescence light is simply mentioned, it is to be understood to refer to the fluorescence light generated in the fluorescent film 13.

The fluorescence light generated in the fluorescent film 13 travels in different directions starting at where it is generated. At least part of the fluorescence light generated in the fluorescent film 13 passes through the lens-form substrate 14 of the front lens 11 and enters the non-front lens 12.

The non-front lens 12 is composed of one or more lenses. Together with the lens-form substrate 14 of the front lens 11, the non-front lens 12 makes the fluorescence light from the fluorescent film 13 into parallel light and direct it to the imaging lens 20. The imaging lens 20 images an image with the fluorescence light from the objective lens 10 on the imaging surface of the image sensor 30. Although, in FIG. 2, the imaging lens 20 is shown as a single lens, the imaging lens 20, like the objective lens 10, may be composed of a plurality of lenses. Through the non-front lens 12, aberrations can be corrected. In a case where aberrations can be corrected sufficiently through the front lens 11 and the imaging lens 20 alone, the non-front lens 12 may be omitted from the imaging optical system.

On the imaging surface of the image sensor 30, photoelectric conversion pixels are arrayed in two dimensions for photoelectric conversion of the image imaged with the fluorescence light. The photoelectric conversion yields an image signal, which is an electrical signal. The image imaged on the image sensor 30 reflects the emission position and the emission intensity of the fluorescence light on the fluorescent film 13. The emission position and the emission intensity of the fluorescence light on the fluorescent film 13 depend on the incidence position and the incidence intensity of the incident rays 100 on the fluorescent film 13. Thus, an image with the fluorescence light reflecting the incidence position and the incidence intensity of the incident rays 100 on the fluorescent film 13 is imaged on the image sensor 30. Here, the imaging optical system including the objective lens 10 and the imaging lens 20 can project the image with the fluorescence light generated in the fluorescent film 13 onto the imaging surface of the image sensor 30 with enlargement (or with reduction as the case may be).

Since the incident rays 100 include information on the structure of the sample SS (that is, information on the external appearance and the internal structure of the sample SS), the image imaged on the image sensor 30 is a shot image of the sample SS including structure information on the sample SS. For example, in a case where X rays are used as the sample irradiation rays, an X-ray Roentgen image of the sample SS is imaged on the image sensor 30.

The front lens 11 including the lens-form substrate 14 and the fluorescent film 13 is formed of, plainly put, a substance that transmits the fluorescence light but that either does not transmit the incident rays 100 or transmits them less than the fluorescence light. That is, the front lens 11 including the lens-form substrate 14 and the fluorescent film 13 is formed of a substance transparent to the fluorescence light, and this substance exhibits a lower transmittance to the incident rays 100 than to the fluorescence light. So long as it has these properties, any kind of substance can be used to form the front lens 11. Here, the lens-form substrate 14 is assumed to be formed of LuAG. LuAG is an abbreviation for $Lu_3Al_5O_{12}$ (lutetium aluminum garnet).

The fluorescent film 13 is formed of a substance obtained by adding an additive, in a predetermined proportion, to the same substance as that of the lens-form substrate 14 (that is, the material of the lens-form substrate 14). Here, the fluorescent film 13 is assumed to be formed of Pr:LuAG. Pr:LuAG is LuAG having praseodymium added as an additive to it. Thus, when irradiated with the incident rays 100, the fluorescent film 13 emits fluorescence light with a wavelength of 305 nm. In the fluorescent film 13, the concentration of the additive is, for example, about 0.5%.

Part (a large part, depending on the thickness of the fluorescent film 13) of the incident rays 100 such as radiation are transmitted through the fluorescent film 13. If the incident rays 100, which are radiation or the like, reach the image sensor 30, they may degrade or destroy the image sensor 30. To prevent that, the lens-form substrate 14 is given such a thickness as to sufficiently attenuate the incident rays 100 that are transmitted through the fluorescent film 13.

On the other hand, the fluorescent film 13 is given a thickness smaller than that of the lens-form substrate 14, that is, for example, a thickness in the range of 100 nm to 2 mm. Reducing the thickness of the fluorescent film 13 helps suppress variation of the emission point of the fluorescence light in the direction of travel of the incident rays 100, leading to better spatial resolution of the imaging apparatus 1. By contrast, increasing the thickness of the fluorescent film 13 helps increase the amount of fluorescence light. The thickness of the fluorescent film 13 can be determined with consideration given to the tradeoff between spatial resolution and the amount of light.

The fluorescent film 13 is bonded to the lens-form substrate 14 so as to maintain continuity of index of refraction. Here, being bonded together so as to maintain continuity of index of refraction means that the bonding interface between the fluorescent film 13 and the lens-form substrate 14 has a substantially uniform index-of-refraction structure. For example, the difference in index of refraction between the lens-form substrate 14 and the fluorescent film 13 is 0.1% or less or of the order of 0.1% relative to the index of refraction of the lens-form substrate 14, and thus it can be said that the bonding interface between the fluorescent film 13 and the lens-form substrate 14 has a substantially uniform index-of-refraction structure. This helps suppress scattering, refraction, and reflection of the fluorescence light at the bonding interface.

Figure 3A:
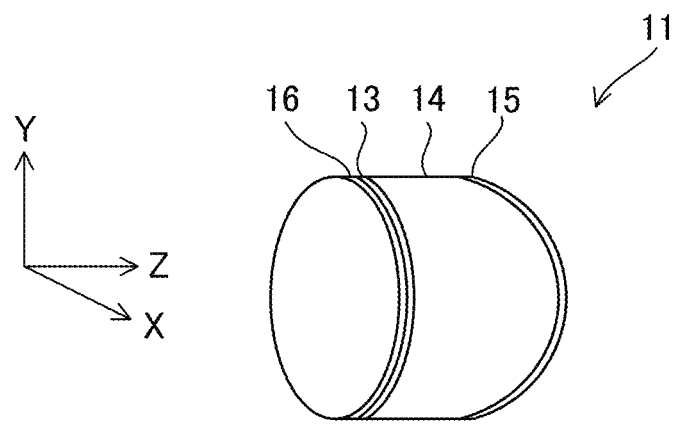
FIGS. 3A and 3B are a perspective view and a side view, respectively, of a front lens provided in an objective lens.
Figure 3B:
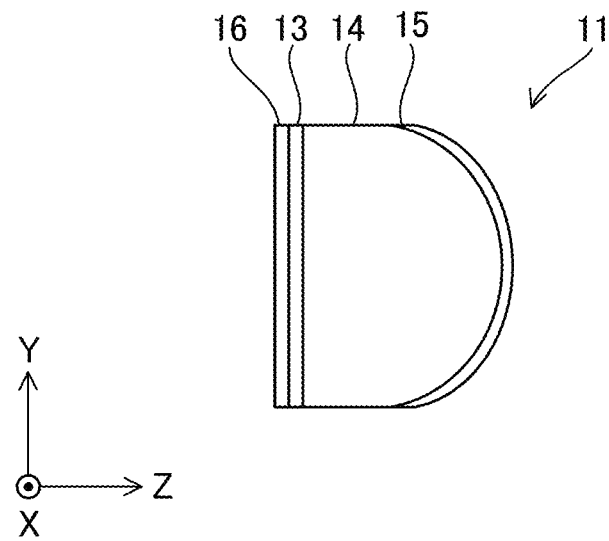

FIGS. 3A and 3B are a perspective view and a side view, respectively, of the front lens 11. Though not shown in FIG. 2 to avoid complicated illustration, an anti-reflection film 15 is disposed in the front lens 11, on the face of the lens-form substrate 14 that does not make contact with the fluorescent film 13, and likewise an anti-reflection film 16 is disposed on the face of the fluorescent film 13 that does not make contact with the lens-form substrate 14. That is, when viewed along the direction of travel of the incident rays 100 (with scattering on the sample SS ignored), the front lens 11 has the anti-reflection film 16, the fluorescent film 13, the lens-form substrate 14, and the anti-reflection film 15 arranged in this order.

The anti-reflection film 15 is, for example, a thin film with a thickness corresponding to one fourth of the wavelength of the fluorescence light. The anti-reflection film 15 prevents reflection of the fluorescence light by canceling the reflection light resulting from the fluorescence light being reflected on the interface between the lens-form substrate 14 and the anti-reflection film 15 with the reflection light resulting from the fluorescence light being reflected on the surface of the anti-reflection film 15. As the anti-reflection film 15, a multi-layer film formed of two or more dielectric films may instead be used.

The anti-reflection film 16 has the same structure as the anti-reflection film 15. The anti-reflection film 16 prevents reflection of the fluorescence light by canceling the reflection light resulting from the fluorescence light being reflected on the interface between the fluorescent film 13 and the anti-reflection film 16 with the reflection light resulting from the fluorescence light being reflected on the surface of the anti-reflection film 16.

Figure 4A:
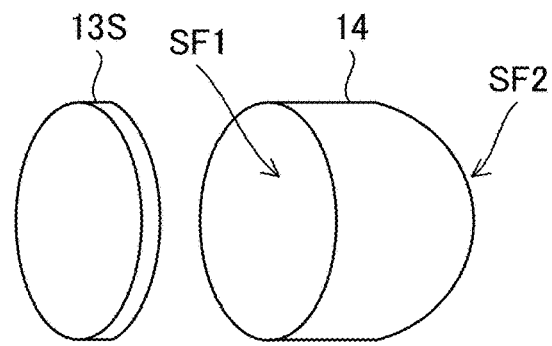
FIGS. 4A to 4D are diagrams illustrating a method of fabricating a front lens provided in an objective lens.
Figure 4B:
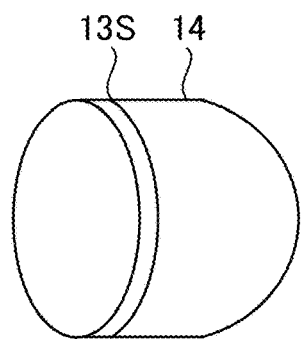
Figure 4C:
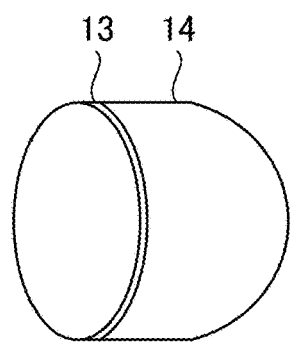

With reference to FIGS. 4A to 4C, an example of the method of fabricating the front lens 11 will be described. It is here assumed that, in the lens-form substrate 14, the face SF1 on which the fluorescent film 13 is formed is a flat surface parallel to the XY plane and the external shape of the flat surface on the XY plane is circular. The external shape may be other than circular. The lens-form substrate 14 functions as a plano-convex lens, and in the lens-form substrate 14, the face opposite from the face SF1 is a convex surface SF2. As shown in FIG. 4A, a fluorescent plate 13S, which will eventually be formed into the fluorescent film 13, and a lens-form substrate 14 are prepared. The fluorescent plate 13S is a plate-form member with the same shape, on the XY plane, as the face SF1 of the lens-form substrate 14, and is formed of the same substance as the fluorescent film 13. The lens-form substrate 14 functions as one of the lenses constituting the objective lens 10, and has a thickness, a curvature, etc. that suit the optical design of the objective lens 10. On the other hand, the fluorescent plate 13S can be given any thickness with consideration given to ease of handling etc.

Figure 4D:
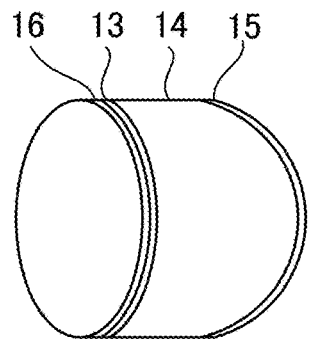

With the fluorescent plate 13S and the lens-form substrate 14 so prepared separately, as shown in FIG. 4B, the face SF1 of the lens-form substrate 14 is bonded to one face of the fluorescent plate 13S by solid-phase diffusion. Then, the fluorescent plate 13S is slimmed down by being polished from the face opposite to the one to which the lens-form substrate 14 is bonded. The fluorescent plate 13S thus slimmed down is the fluorescent film 13 (see FIG. 4C). In a case where the fluorescent plate 13S has from the beginning the same thickness as the fluorescent film 13, the fluorescent plate 13S does not need to slimmed down. Finally, as shown in FIG. 4D, for example by vacuum deposition, an anti-reflection film 15 is formed on the face of the lens-form substrate 14 that does not make contact with the fluorescent film 13, and an anti-reflection film 16 is formed on the face of the fluorescent film 13 that does not make contact with the lens-form substrate 14.

The method of bonding by solid-phase diffusion here is similar to the method of bonding together a substrate and a fluorescent plate in Patent Document 1 (JP-A-2016-45183), and also the pre-processing (polishing, cleaning, etc.) of the lens-form substrate 14 and the fluorescent plate 13S that can be performed prior to bonding as well as the method of slimming down the fluorescent plate 13S are as disclosed in Patent Document 1. The method of fabricating the front lens 11 shown in FIGS. 4A to 4D is merely an example, and allows for various modifications. For example, the order of the steps in the procedure may be changed in any way from what has been described. Specifically, for example, it is also possible to first bond together, by solid-phase diffusion, the fluorescent plate 13S and the substrate (hereinafter the raw substrate) eventually made into the lens-form substrate 14, then slim down the fluorescent plate 13S to form the fluorescent film 13, and then form the raw substrate into the shape of a lens. So processed, the raw substrate is now the lens-form substrate 14.

The above description deals with a case where the lens-form substrate 14 and the fluorescent plate 13S, which are formed from a common base material, are bonded together by solid-phase diffusion without the use of an impurity such as adhesive. This, however, is not meant to exclude the lens-form substrate 14 and the fluorescent plate 13S being bonded together with adhesive (after bonding, the procedure continues as described above). It is possible even to bond together a lens-form substrate 14 and a fluorescent plate 13S made of different base materials. In a case where the lens-form substrate 14 and the fluorescent plate 13S are bonded together with adhesive, however, the fluorescence light is scattered and reflected at the interface between the adhesive and the lens-form substrate 14 and at the interface between the adhesive and the fluorescent film 13 (the fluorescent plate 13S after being slimmed down), and this blurs the image imaged on the image sensor 30. To avoid this, it is preferable to use solid-phase diffusion. Nevertheless, so long as the fluorescent film 13 can be bonded to the face SF1 of the lens-form substrate 14, any bonding method can be used. For example, the substance (here, Pr:LuAG) of which the fluorescent film 13 is formed may be deposited on the face SF1 of the lens-form substrate 14. In any case, on the incidence side of the objective lens 10 (more precisely, at the face of the objective lens 10 closer to the position of incidence of the incident rays 100), the fluorescent film 13 is provided so as to be unitary with the objective lens 10 (here, the front lens 11).

On the face of the fluorescent film 13 that does not make contact with the lens-form substrate 14, instead of the anti-reflection film 16, a reflective film that reflects the fluorescence light may be provided. The fluorescence light generated in the fluorescent film 13 travels in different directions starting at where it is generated. The reflective film reflects the fluorescence light traveling toward it to direct the fluorescence light toward the non-front lens 12. Using the reflection film helps increase the amount of fluorescence light that reaches the image sensor 30, and also helps suppress passage through the front lens 11 of stray light (such as visible light) other than the fluorescence light, but tends to lead to lower spatial resolution. That is, a comparison of a structure where an anti-reflection film 16 is provided on the face of the fluorescent film 13 that does not make contact with the lens-form substrate 14 with a structure where a reflective film is provided there finds the latter advantageous in the amount of fluorescence light and the former advantageous in spatial resolution. Even in a case where a reflection film is provided, making the fluorescent film 13 sufficiently thin helps keep the lowering of spatial resolution to a negligible degree. Conversely, in a case where an anti-reflection film 16 is provided, the fluorescent film 13 does not need to be made so thin.

Figure 20:
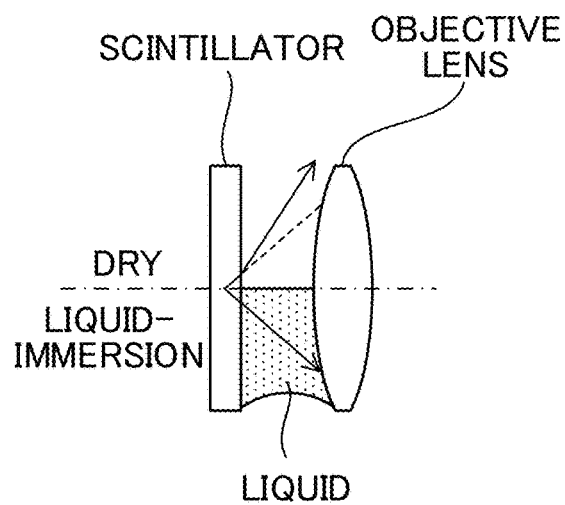
FIG. 20 is a diagram for comparison of a dry objective lens with a liquid immersion objective lens in connection with conventional technology.

In a conventional imaging apparatus (see FIG. 20), the medium between the lens and the scintillator is a gas or liquid, or a vacuum is present between the lens and the scintillator. By contrast, in the imaging apparatus 1 of this embodiment, the medium between the lens and the scintillator is the lens-form substrate 14, which is a solid transparent to the fluorescence light. That is, in the embodiment, giving the shape of a lens to a substrate that is needed also to attenuate the incident rays 100 such as radiation results in the medium between the lens and the scintillator being filled by (substantiated with) the substrate (here, the lens-form substrate 14). This makes it possible to give the medium an index of refraction n higher than with conventional dry objective lenses and liquid-immersion objective lenses.

Consider a case where, as described above, the lens-form substrate 14 is formed of LuAG and the fluorescent film 13 emits fluorescence light with a wavelength $\lambda$ of 305 nm. Since LuAG has an index of refraction n of 2.03, if the angle of aperture $\theta$ is assumed to be 72 degrees, then the numerical aperture NA of the objective lens 10 is found as $NA = n \cdot \sin \theta = 2.03 \times \sin 72° \approx 1.93$, which is far larger than the conventional limit of angle of aperture (0.95 with a dry objective lens). In this case, the spatial resolution $\delta$ of the imaging optical system of the imaging apparatus 1 is found as $\delta = 0.61 \times \lambda / NA = 0.61 \times 305 \times 10^{-9} / 1.93 \approx 96 \times 10^{-9}$, which is far higher than the conventional limit of spatial resolution.

As described above, with the imaging apparatus 1 of this embodiment, it is possible to greatly enhance the numerical aperture of the objective lens and the spatial resolution of the imaging optical system compared with the conventional norms. Moreover, the use of a solid as the medium is expected to achieve greatly enhanced temperature stability compared with a liquid-immersion objective lens. Furthermore, unlike a liquid, a solid neither has fluidity nor vaporizes, and thus achieves long-term mechanical stability.

To obtain a resolution as high as over 100 nm as in the above numerical example, it is necessary not only to increase the numerical aperture NA and shorten the wavelength $\lambda$ of the fluorescence light but also to reduce as much as possible factors leading to lower resolution. When a lens-form substrate 14 and a fluorescent film 13 formed of a common base material (for example, LuAG) are bonded together directly, the difference in index of refraction between them is 0.1% or less; thus, the member resulting from the lens-form substrate 14 and the fluorescent film 13 being bonded together appears to be substantially a single crystalline body in optical terms. This helps minimize the lowering of resolution at the interface between the lens-form substrate 14 and the fluorescent film 13. Accordingly, it is preferable that the lens (here, the lens-form substrate 14) that is included in the objective lens 10 and that has the fluorescent film 13 provided unitarily with it be formed of a solid optical material (here, LuAG) with such an index of refraction that the difference in index of refraction between that lens and the fluorescent film 13 has a predetermined value or less. The predetermined value can be 0.1%, and can be any other value close to 0.1%.

Generally, in imaging apparatuses such as microscopes, the plane on which a specimen as the imaging target lies is called the specimen plane, and the distance from the front end of the objective lens to the specimen plane with focus on the specimen plane (in other words, the distance from the front end of the objective lens to the specimen with focus on the specimen) is called the working distance. In the imaging apparatus 1 according to this embodiment, the fluorescent film 13 corresponds to the specimen (that is, the fluorescent film 13 serves as the light source as the imaging target). In the imaging apparatus 1, the specimen plane is set at the fluorescent film 13, and the imaging optical system is designed such that the position at which focus is achieved (focal position) is fixed at the fluorescent film 13 as the specimen plane, with the result that the working distance of the objective lens 10 has a zero or negative value.

That is, the imaging optical system is designed such that the fluorescence light emanating from a given emission point on the scintillator (here, the fluorescent film 13) is imaged at one point on the image sensor 30. Here, "one point" is a concept covering a size corresponding to the permissible circle of confusion, and it is preferable that the fluorescent film 13 be disposed within the depth of field of the imaging optical system.

Figure 5A:
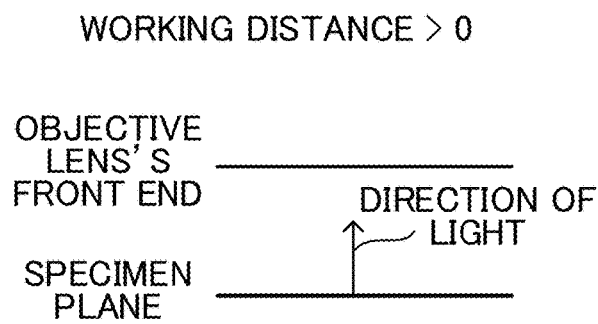
FIGS. 5A to 5C are diagrams illustrating the working distance of an objective lens.
Figure 5B:
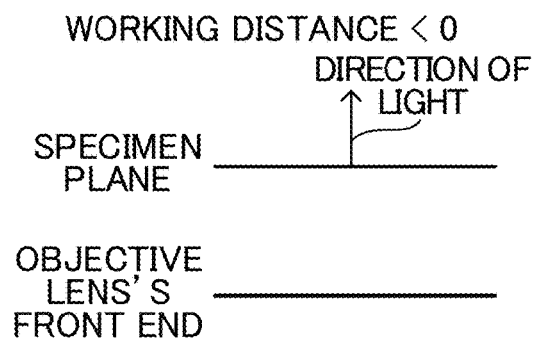

A supplementary description will now be given of the working distance of the objective lens 10. The fluorescent film 13 has a finite thickness t in the Z-axis direction. Thus, when the focal position is set at the middle of the fluorescent film 13, the working distance equals ($-t/2$). That is, it can be said that the working distance has a negative value. As shown in FIG. 5A, in a case where, as in an imaging apparatus like a common microscope, the direction pointing from the specimen plane to the front end of the objective lens and the direction of light traveling from the specimen plane into the imaging optical system coincide, the working distance has a positive value. In contrast, in a case where, as shown in FIG. 5B, the direction pointing from the specimen plane to the front end of the objective lens and the direction of light traveling from the specimen plane into the imaging optical system are opposite to each other, the working distance has a negative value.

Figure 5C:
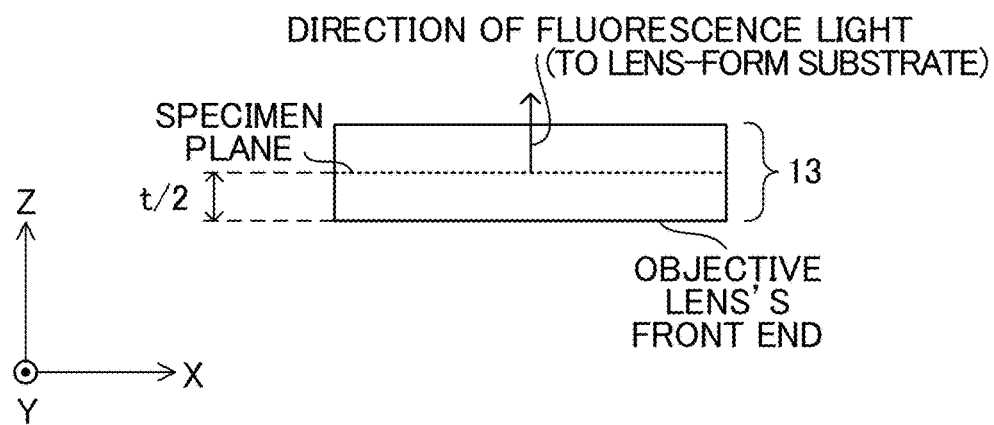

In the imaging apparatus 1, when the focal position is set at the middle of the fluorescent film 13, then, as shown in FIG. 5C, a plane that passes through the middle of the fluorescent film 13 and that is parallel to the XY plane is the specimen plane. Thus, the direction pointing from the specimen plane to the front end of the objective lens and the direction of fluorescent light traveling from the specimen plane into the imaging optical system are opposite to each other, and the working distance has a negative value, ($-t/2$). When it is assumed that the incident rays 100 travel from the negative to the positive side along the Z axis, the front end of the objective lens refers to the part of the front lens 11 that is located farthest to the negative side along the Z axis (in other words, the part of the fluorescent film 13 located farthest to the negative side along the Z axis). In the imaging optical system, if the position of the front end of the objective lens and the position of the specimen plane coincides, the working distance equals zero.

Focus can be adjusted, specifically, in the following manner for instance. In the optical path from the fluorescent scintillator (here, the fluorescent film 13) to the image sensor 30, the imaging lens 20 is inserted between the objective lens 10 and the image sensor 30 such that the position of the imaging lens 20 along the optical axis of the optical path is adjustable with the imaging lens driver 60. Then, the position of the imaging lens 20 can be adjusted and determined so that the image with the fluorescence light is imaged on the imaging surface of the image sensor 30 (that is, so that focus is on the fluorescent film 13; in other words, so that the image with the fluorescence light is in focus on the image sensor 30). Although here the optical path from the fluorescent scintillator (here, the fluorescent film 13) to the image sensor 30 is assumed to be a straight-line optical path, it may instead be a bent or folded optical path as achieved with a reflecting optical system.

Aberrations (spherical, chromatic, and other aberrations) arising in the imaging optical system can be corrected in, of the plurality of lenses constituting the imaging optical system, the objective lens 10.

For the sake of convenience, the configuration, operation, and other features of the imaging apparatus 1 described thus far will be referred to as the basic practical example. The basic practical example is open to modified and other techniques such as those described below by way of a number of practical examples. Unless otherwise stated, or unless inconsistent, the description of the basic practical example applies to the practical examples described below; for any specific description of any of the practical examples described later that is inconsistent with the basic practical example, that specific description of the practical example prevails. Unless inconsistent, any of the features described in connection with any of the several practical examples described below applies to any other of the practical examples (that is, any two or more of the several practical examples can be combined together).

<<First Practical Example>>

A first practical example will be described. In the basic practical example, the lens-form substrate 14 is given the shape of a plano-convex lens so that the front lens 11 functions as a plano-convex lens. Depending on the design of the objective lens 10, the shape of the lens-form substrate 14, and hence the shape of the front lens 11, may be modified in any way. For example, the shape of the lens-form substrate 14 may be determined such that the front lens 11 functions as a plano-concave lens, a biconvex lens, a biconcave lens, a meniscus lens, an achromatic lens, or a cemented lens or as a lens array comprising such lenses. These lenses may have not necessarily spherical but aspherical surfaces.

Specifically, for example, although in the basic practical example, the front lens 11 has a flat surface on the incidence face and a convex surface on the emergence face, instead any of the front lenses 11a to 11g shown in FIGS. 6A to 6G may be used as the front lens 11. In FIGS. 6A to 6G, the reference signs "13a to 13g" indicate the fluorescent films 13 in the front lenses 11a to 11g respectively, and the reference signs "14a to 14g" indicate the lens-form substrate 14 in the front lenses 11a to 11g respectively. With respect to any front lens described in connection with the basic practical example, the first practical example, and the practical examples described later, the incidence face denotes the face of the front lens disposed on the side of incidence of the incident rays 100 (that is, the face that receives the incident rays 100 and, with respect to the lens-form substrate, the face through which the fluorescence light is incident), and the emergence face denotes the face of the front lens opposite from the face disposed on the side of incidence of the incident rays 100 (with respect to the lens-form substrate, the face through which the fluorescence light emerges).

The front lens 11a has a flat surface on the incidence face and a concave surface on the emergence face.

The front lens 11b has a concave surface on the incidence face and a flat surface on the emergence face.

The front lens 11c has a concave surface on the incidence face and a concave surface on the emergence face.

The front lens 11d has a concave surface on the incidence face and a convex surface on the emergence face.

The front lens 11e has a convex surface on the incidence face and a flat surface on the emergence face.

The front lens 11f has a convex surface on the incidence face and a concave surface on the emergence face.

The front lens 11f has a convex surface on the incidence face and a convex surface on the emergence face.

With respect to any front lens described in connection with the basic practical example, the first practical example, and the practical examples described later, its having a concave or convex surface on the incidence face means that the incidence face has a concave or convex surface but does not exclude its partly having a flat surface. Likewise, with respect to any front lens described in connection with the basic practical example, the first practical example, and the practical examples described later, its having a concave or convex surface on the emergence face means that the emergence face has a concave or convex surface but does not exclude its partly having a flat surface With respect to any front lens described in connection with the basic practical example, the first practical example, and the practical examples described later, when it has a concave or convex surface on the incidence face, the image with the fluorescence light resulting from the fluorescent film on the front lens receiving the incident rays 100 is transitorily an image on a curved surface; the image on the curved surface is then converted into an image on a flat surface (a planar image) through the objective lens 10 composed of a plurality of lenses so that the planar image is imaged, via the imaging lens 20, on the imaging surface of the image sensor 30. That is, the imaging optical system is designed such that, whichever of the front lenses described in connection with the basic practical example, the first practical example, and the practical examples described later is used, an image with the fluorescence light from the fluorescent film is imaged as a planar image on the imaging surface of the image sensor 30. In a case where the image with the fluorescence light obtained from the fluorescent film is an image on a curved surface, the image with the fluorescence light can be projected onto the image sensor 30 by any method including equidistant projection, equi-solid angle projection, stereographic projection, and orthogonal projection. Lens designs for converting an image on a curved surface formed with a concave or convex surface into an image on a flat surface are well-known, and therefore no details in this respect will be given. In a case where the image with the fluorescence light obtained from the fluorescent film is an image on a flat surface as when a plano-convex lens is used as the front lens, the image with the fluorescence light can be projected onto the image sensor 30 by central projection.

Figure 7:
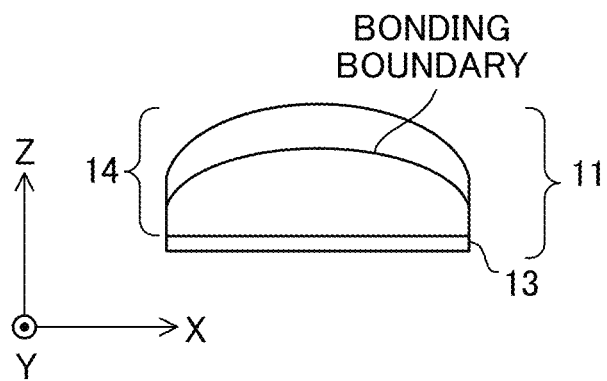
FIG. 7 is a diagram showing a front lens formed as a cemented lens in connection with the first practical example of the present invention.

Any front lens described in connection with the basic practical example, the first practical example, and the practical examples described later may be formed as a cemented lens. As an example, FIG. 7 shows a side view of the front lens 11 in the basic practical example when it is formed as a cemented lens. Forming the front lens 11 as a cemented lens means composing the lens-form substrate 14 of the front lens 11 by bonding together a plurality of lenses. In FIG. 7, two lenses are bonded together to compose the lens-form substrate 14; instead, three or more lenses may be bonded together to compose the lens-form substrate 14. The same applies in cases where any front lens other than the front lens 11 in the basic practical example is formed as a cemented lens.

<<Second Practical Example>>

A second practical example will be described. The second practical example deals with specific modified techniques related to the shape of the lens-form substrate.

Figure 8:
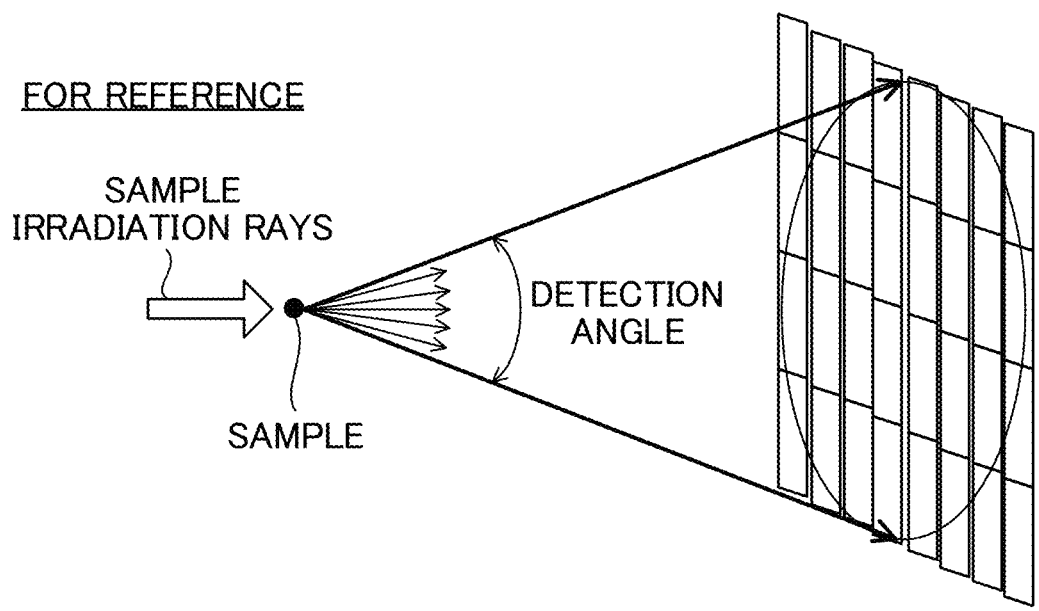
FIG. 8 is a diagram, for reference, for comparison with a second practical example of the present invention.

Suppose that sample irradiation rays such as X rays are shone on a sample and are diffracted. Then the angle between the vector indicating the direction of travel of the sample irradiation rays before diffraction and the vector indicating the direction of travel of the sample irradiation rays after diffraction is defined as the angle of diffraction $\phi$. The image of the diffracted light contains structure information on the sample SS, and it contains structure information with higher spatial resolution the farther to the wide-angle side (that is, in a range of larger angles of diffraction $\phi$). That is, monitoring diffracted components farther to the wide-angle side is essential to achieve high resolution. To monitor diffracted components as far to the wide-angle side as possible, in a case where a detector with a flat detection surface is used, it is necessary either to bring the detection surface close to the sample or to make the detection surface larger. Bringing the detection surface too close to the sample, however, inconveniently leads to the detector exhibiting insufficient resolution when sensing the angle of diffraction. To avoid this, a common practice is to make the detection surface larger while it is disposed at a distance at which it exhibits sufficient resolution. Different methods of making the detection surface larger have been studied, such as increasing the area of the scintillator and using a sensor array with image sensors arrayed in two dimensions. The concept of such methods is shown, for reference, in FIG. 8. Inconveniently, those methods lead to an increase in the cost and size of the apparatus.

In view of the above, in the second practical example, a front lens with a concave surface on the incidence face is used. FIG. 9A is a sectional view of the lens-form substrate 14A across any sectional plane perpendicular to the Z axis. The lens-form substrate 14A has two faces SF1A and SF2A opposite from each other, the faces SF1A and SF2A corresponding to the faces SF1 and SF2 in the basic practical example (see FIG. 4A). That is, of the faces SF1A and SF2A, the face SF1A corresponds to the incidence face, and the face SF2A corresponds to the emergence face. The face SF1A is a concave surface, and the face SF2A is a convex surface. FIG. 9B is a sectional view of the front lens 11A across any sectional plane perpendicular to the Z axis. A fluorescent film 13A as a scintillator is bonded to the concave face SF1A of the lens-form substrate 14A, and thereby the front lens 11A is formed. That is, in the second practical example, the front lens 11A, the fluorescent film 13A, and the lens-form substrate 14A are used as the front lens 11, the fluorescent film 13, and the lens-form substrate 14. The concave face SF1A corresponds to one half of a spherical surface (hereinafter referred to also as the hemispherical surface), and in FIG. 10, the center of the spherical surface is indicated by the reference symbol "SO". In the above description, for the sake of convenience, the concave face SF1A is described as being provided on the lens-form substrate 14A; instead, with attention paid to the entire front lens 11A, the concave face SF1A can be understood to be the incidence face of the front lens 11A.

Figure 11:
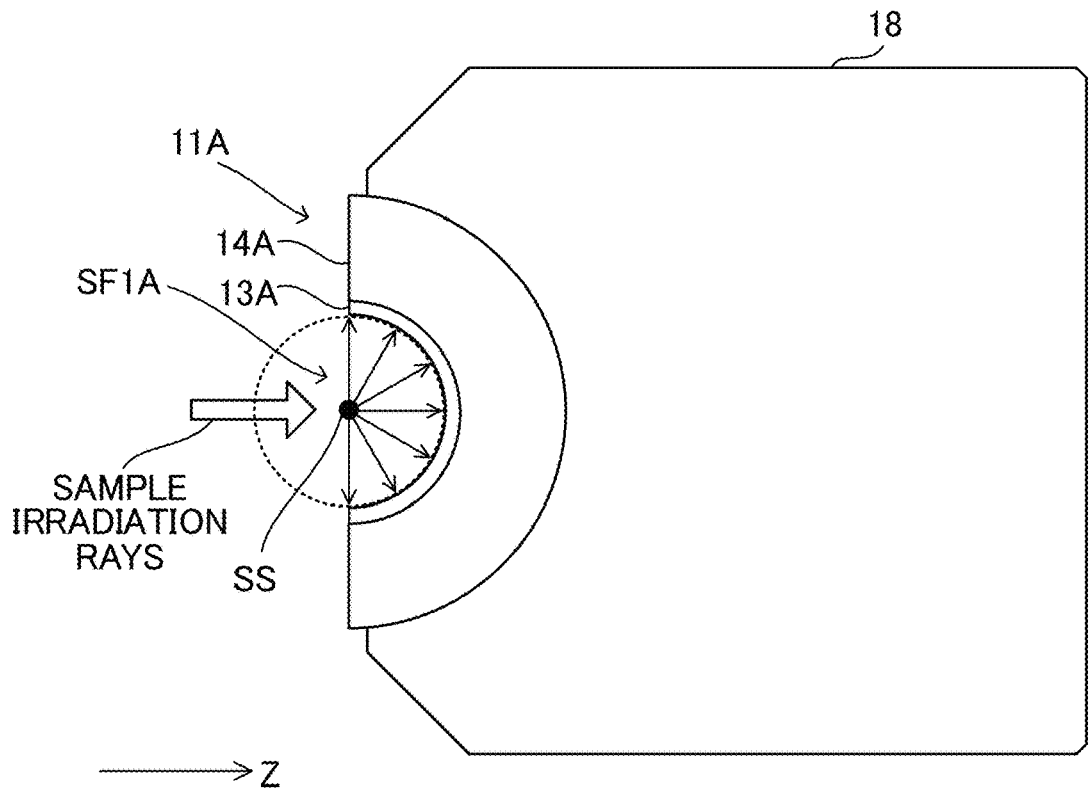
FIG. 11 is a diagram showing an example of the relationship among a sample, a front lens, and diffracted light from the sample in connection with the second practical example of the present invention.

As shown in FIG. 11, A sample SS can be placed at the center of the above-mentioned spherical surface. Then, the incident rays 100 with angles of diffraction $\phi$ of 90 degrees or less are all incident on the fluorescent film 13A, which is shaped just like the concave face SF1A, and contribute to the emission of fluorescence light. In FIG. 11, the reference sign "18" conceptually indicates a subsequent-stage component of the front lens 11A, though how it appears there is not to be understood to represent the actual shape of the subsequent-stage component of the front lens 11 (the same applies to FIGS. 13 and 14, which will be referred to later). Although FIG. 11 shows a section through the front lens 11A and the subsequent-stage component 18, to avoid complicated illustration, they are not hatched there (the same applies to FIGS. 13 and 14, which will be referred to later).

Figure 12:
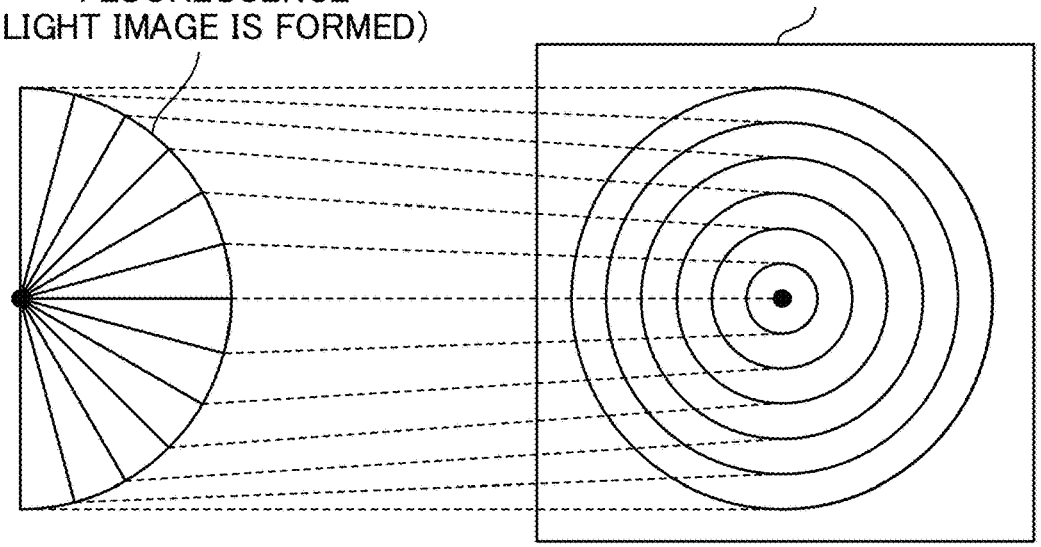
FIG. 12 is a conceptual diagram of equidistance projection in connection with the second practical example of the present invention.

In the fluorescent film 13A, based on the incident rays 100 incident on it, a spherical image with the fluorescence light is acquired. The image with the fluorescence light from the fluorescent film 13A is converted, by equidistant projection through the objective lens 10, from a spherical image (an image on a spherical surface) to a planar image (an image on a flat surface), and is then imaged on the image sensor 30. FIG. 12 is a conceptual diagram of equidistant projection. As will be understood from a comparison of FIG. 8, for reference, and FIG. 11, with the second practical example, it is possible to monitor diffracted components sufficiently far to the wide-angle side (to acquire diffraction signals of the incident rays 100 up to ultra-wide angles) in a space-saving manner, and thus to obtain high spatial resolution.

The concave face SF1A may be, instead of a spherical surface, an ellipsoidal surface. That is, the concave face SF1A may be one half of an ellipsoidal surface (hereinafter referred to also as the semi-ellipsoidal surface).

Figure 13:
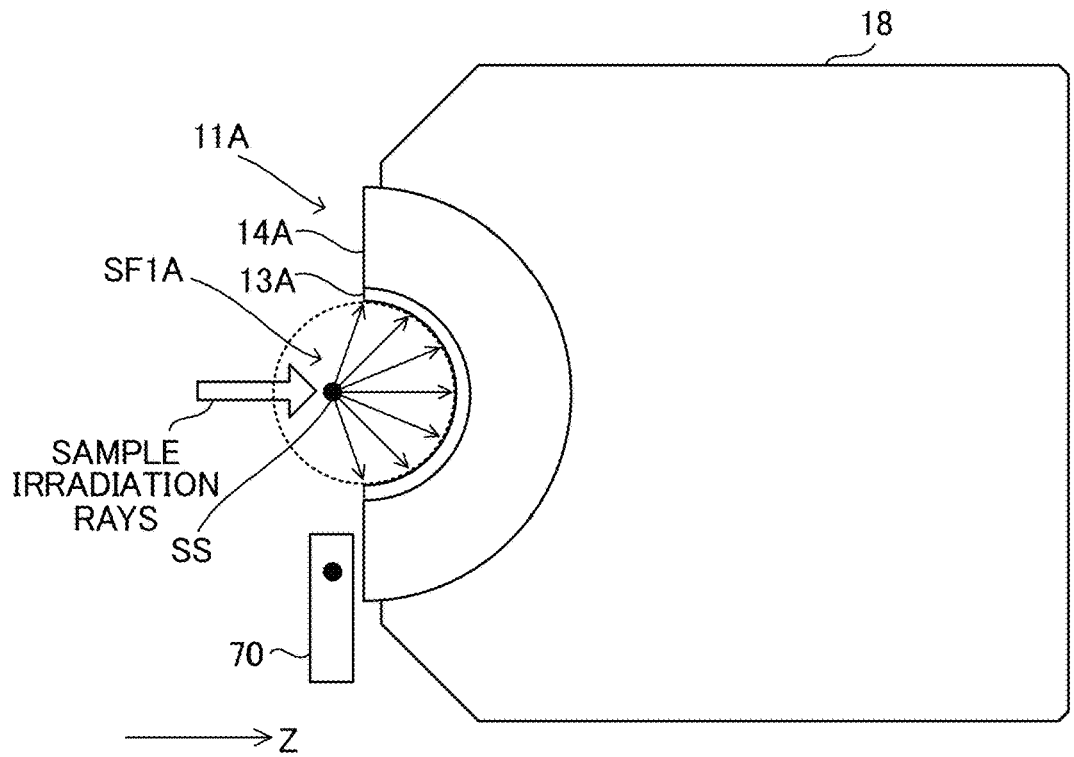
FIG. 13 a diagram showing another example of the relationship among a sample, a front lens, and diffracted light from the sample in connection with the second practical example of the present invention.

With consideration given to maximizing the diffracted components acquired on the wide-angle side, achieving symmetry in the image obtained, etc., the sample SS can be placed at the center of the spherical or ellipsoidal surface; instead, the sample SS may be placed anywhere else. For example, if it is tolerable to narrow the range in which diffracted components on the wide-angle side are acquired, for example, in a case where, for reasons associated with the placement of the sample SS, ample space needs to be left behind, the sample SS can be placed at a position farther from the concave face SF1A than is the center of the spherical or ellipsoidal surface. More specifically, for example, as shown in FIG. 13, the sample SS can be placed at a position shifted by a predetermined distance from the center of the spherical or ellipsoidal surface in the direction opposite to the direction of travel of the sample irradiation rays. The position of the sample SS can be understood to indicate the position of the center of gravity, or the geometric center, of the sample SS. In FIG. 13, the reference sign "70" indicates a sample feeder that feeds the sample SS at the so shifted position. It is also possible to place the sample SS at a position closer to the concave face SF1A than is the center of the spherical or ellipsoidal surface.

Figure 14:
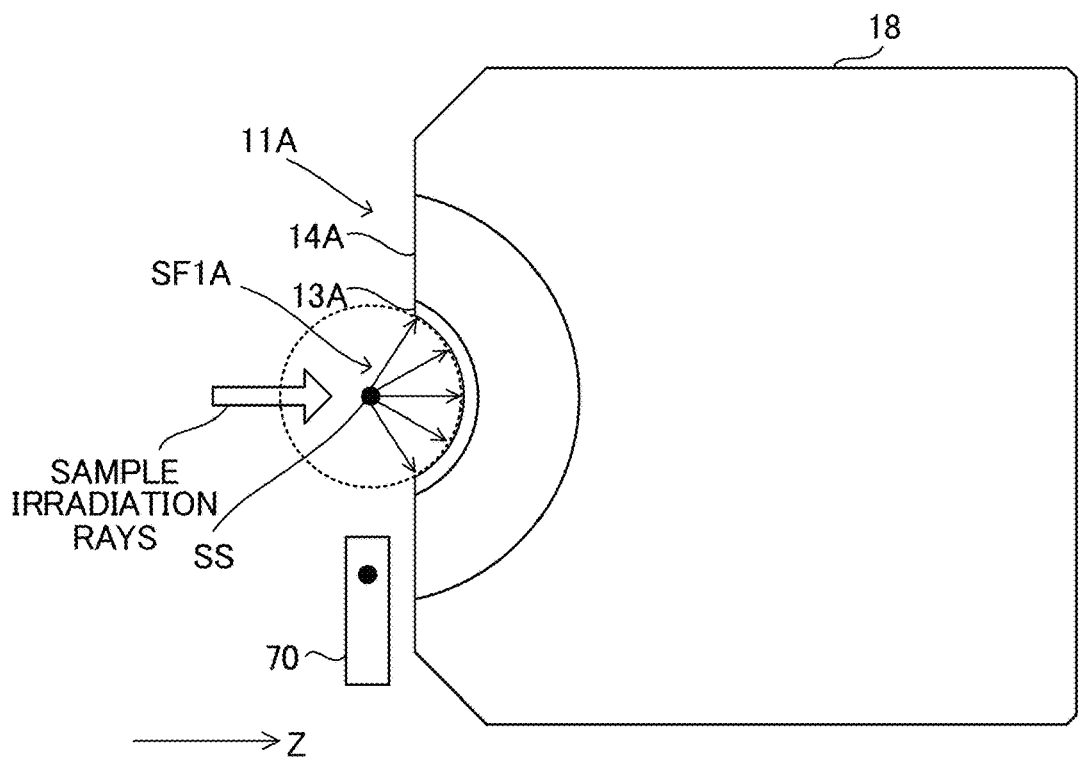
FIG. 14 a diagram showing yet another example of the relationship among a sample, a front lens, and diffracted light from the sample in connection with the second practical example of the present invention.

As mentioned previously, the concave face SF1A can be formed in the shape of one half of a spherical surface (that is, a hemispherical surface). Instead, the concave face SF1A may be part of a hemispherical surface. Specifically, suppose that an entire spherical surface is divided into two parts across a plane that does not pass through the center of the spherical surface; then the shape of the smaller of the two partial spherical surfaces (spherical crowns) may given to the concave face SF1A. This is advantageous, in particular, in a case where, for reasons associated with the placement of the sample SS, ample space needs to be left behind. That is, when a placement as exemplified by one in FIG. 13 is adopted, it is possible, as shown in FIG. 14, to form the concave face SF1A in the shape of part of a semispherical surface. Likewise, the concave face SF1A can be formed in the shape of part of semi-ellipsoidal surface.

Figure 6A:
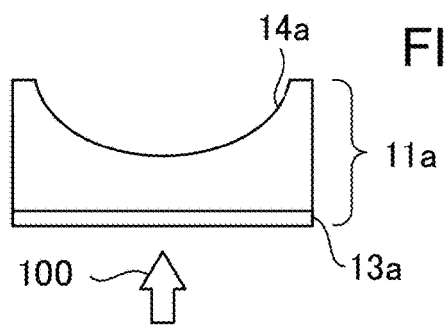
FIGS. 6A to 6G are diagrams showing various modified shapes of a front lens in connection with a first practical example of the present invention.
Figure 6B:
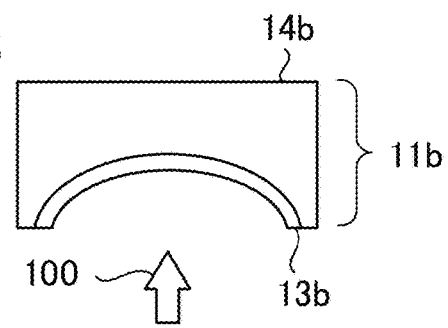
Figure 6C:
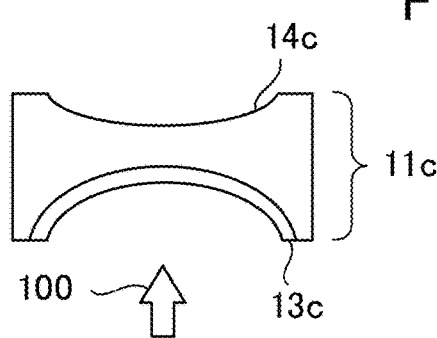
Figure 6D:
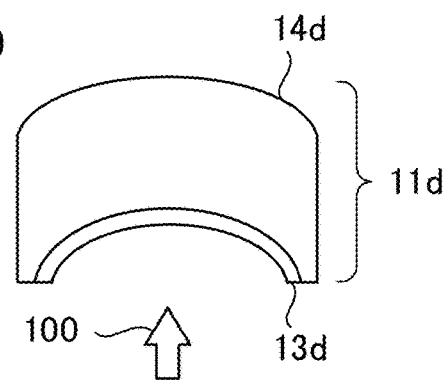
Figure 6E:
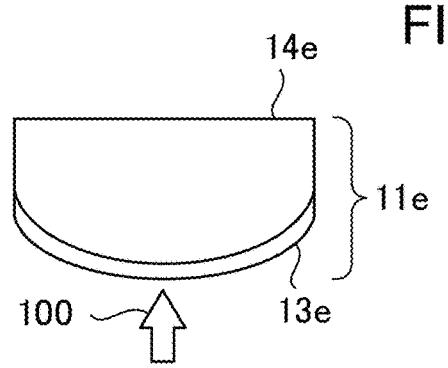
Figure 6F:
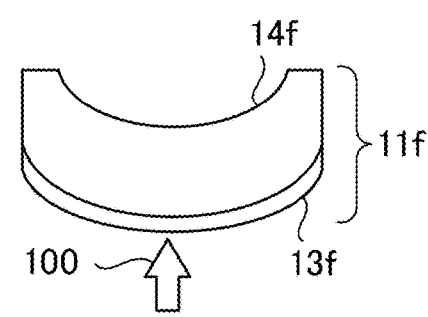
Figure 6G:
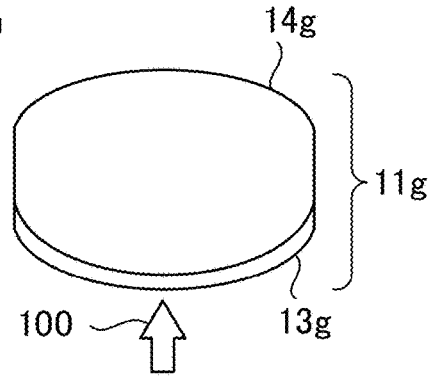

In the first practical example described previously, as modified examples of the front lens 11 in the basic practical example, the front lenses 11a to 11g are presented (see FIGS. 6A the 6G). The front lens 11A in the second practical example serves also as an example of the front lens 11d in the first practical example. In the second practical example, the shape of the lens-form substrate 14A may be modified such that the emergence face of the front lens 11A is a flat or concave surface.

<<Third Practical Example>>

Figure 15:
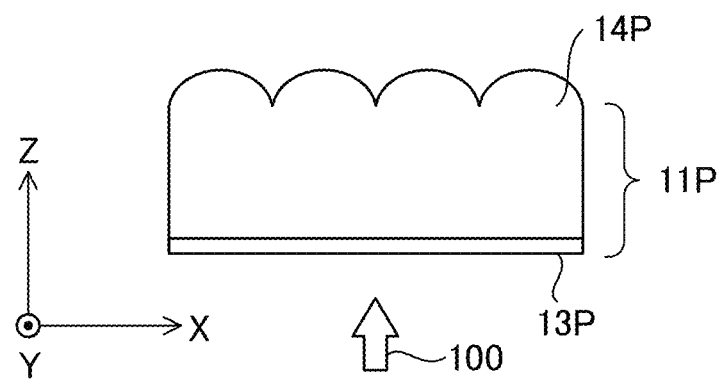
FIG. 15 is a diagram showing a front lens having a convex lens array formed on the emergence face in connection with a third practical example according to the present invention.
Figure 16:
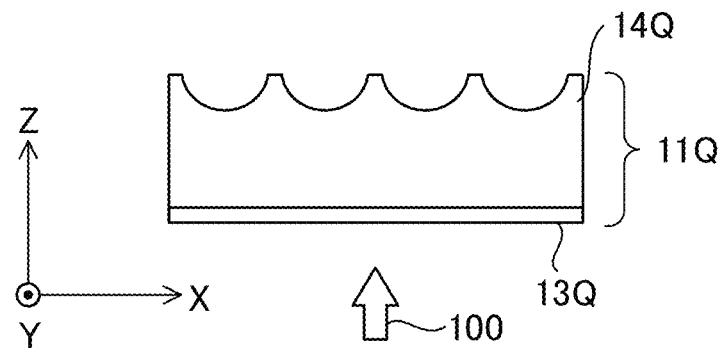
FIG. 16 is a diagram showing a front lens having a concave lens array formed on the emergence face in connection with the third practical example according to the present invention.

A third practical example will be described. While the front lens 11 is given a flat, concave, or convex surface on the incidence face, the front lens 11 may have a convex lens array formed on the emergence face; likewise, while the front lens 11 is given a flat, concave, or convex surface on the incidence face, the front lens 11 may have a concave lens array formed on the emergence face. FIGS. 15 and 16 show front lenses 11P and 11Q, respectively, as examples of the front lens 11 that employs a lens array. The front lens 11P is given a flat surface on the incidence face, and has a convex lens array formed on the emergence face. The front lens 11Q is given a flat surface on the incidence face, and has a concave lens array formed on the emergence face. In FIGS. 15 and 16, the reference signs "13P" and "13Q" indicate the fluorescent films 13 in the front lenses 11P and 11Q, respectively, and the reference signs "14P" and "14Q" indicate the lens-form substrates 14 in the front lenses 11P and 11Q, respectively.

Though not clear in FIG. 15, on the emergence face of the front lens 11P, a plurality of convex surfaces are arranged along each of the X-axis and Y-axis directions so that a convex lens array composed of a plurality of convex surfaces is formed. This, however, is not meant to exclude a plurality of convex surfaces being arranged along only one of the X-axis and Y-axis directions Likewise, on the emergence face of the front lens 11Q, a plurality of concave surfaces are arranged along each of the X-axis and Y-axis directions so that a concave lens array composed of a plurality of concave surfaces is formed. This, however, is not meant to exclude a plurality of concave surfaces being arranged along only one of the X-axis and Y-axis directions.

Figure 17:
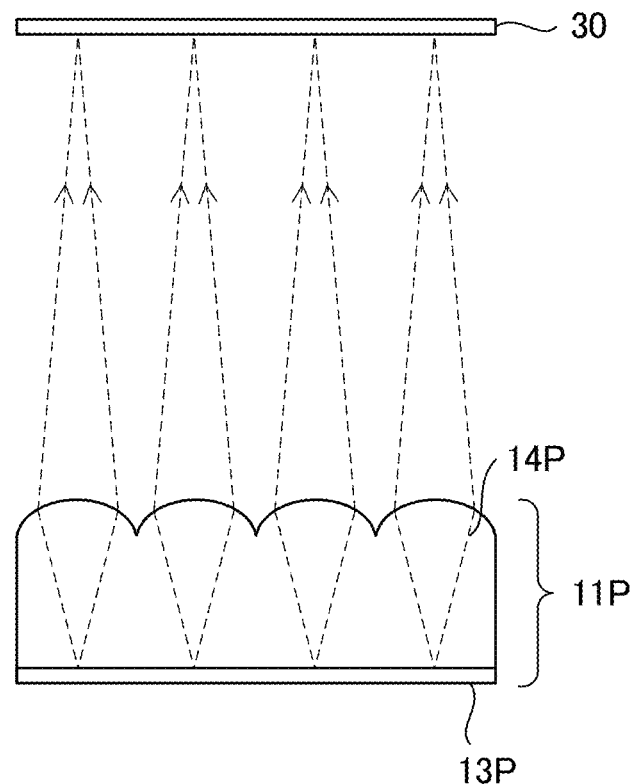
FIG. 17 is a diagram showing an optical path of fluorescence light in connection with the third practical example according to the present invention.

FIG. 17 schematically shows, for a case where the front lens 11P is used, the optical path of the fluorescence light from the fluorescent film 13P. In FIG. 17, the imaging lens 20 is omitted from illustration. The fluorescence light generated at a given point on the fluorescent film 13P travels through one of the convex surfaces constituting the convex lens array and converges at a position on the image sensor 30 corresponding to the position of the given point. Using the front lens 11P eliminates the need for the non-front lens 12. Using the front lens 11Q requires a separate optical system for imaging, such as a convex lens array disposed at a position opposite the emergence face of the front lens 11. In this practical example, the imaging apparatus 1 does not have so high a spatial resolution as in the basic practical example etc., but offers enhanced light convergence efficiency when a large-area scintillator is used.

<<Fourth Practical Example>>

A fourth practical example will be described. In the fourth practical example, and in the practical examples described later, it is assumed that the front lens, the fluorescent film, and the lens-form substrate refer to the front lens, the fluorescent film, and the lens-form substrate presented in connection with one of the basic practical example and the first to third practical examples described previously.

In the imaging apparatus 1, whereas the fluorescent film functions as a scintillator, the lens-form substrate does not function as a scintillator. That is, even when the incident rays 100 are incident on the lens-form substrate, no fluorescence light is generated in the lens-form substrate. This, however, is not meant to exclude feeble fluorescence light being generated in the lens-form substrate when the incident rays 100 are incident on it.

In the imaging apparatus 1, the material of the lens-form substrate (that is, the substance of which the lens-form substrate is formed) is the base material of the scintillator. While the above description deals with examples where LuAG is used as the material of the lens-form substrate, this is not meant to limit the material of the lens-form substrate; instead, any of a variety of solid optical materials can be adopted as the material of the lens-form substrate. As the material of the lens-form substrate (that is, as a solid optical material), it is possible to use, for example, any of $Y_3Al_5O_{12}$, $Lu_2SiO_5$, LuYSiO$_5$, LuYSiO$_5$, $Gd_3Ga_5O_{12}$, $CdWO_4$, $Bi_4Ge_3O_{12}$, $Gd_2SiO_5$, $Gd_2O_2S$, $Y_2SiO_5$, $Yb_2SiO_5$, $YAlO_3$, $LuAlO_3$, $Gd_3Al_2Ga_3O_{12}$, $LaBr_3$, $CeBr_3$, $SrI_2$, $GdAlO_3$, $Cs_2HfCl_6$, $LiCaAlF_6$, and $Lu_2O_3$ or any mixture of two or more of those.

The fluorescent film is formed of a material obtained by adding a predetermined additive to the material of the lens-form substrate. The additive is not limited to the one mentioned above, and may be any other material so long as the fluorescent film functions as a scintillator; the kind of additive can be determined with consideration given to, for example, the desired wavelength of the fluorescence light. The concentration of the additive in the fluorescent film also can be determined as desired.

As described above, the base material and the additive for the scintillator can be modified in many ways, and the fluorescence light generated in the fluorescent film can be any light classified as ultraviolet or visible light with a wavelength, for example, in the range of 200 nm to 700 nm.

In a case where the lens-form substrate is formed of LuAG and the fluorescent film is designed to emit fluorescence light with a wavelength λ of 305 nm, the lens-form substrate has an index of refraction n=2.03. Needless to say, this index of refraction n varies depending on the material and the fluorescence wavelength of the lens-form substrate etc.

<<Fifth Practical Example>>

Figure 18:
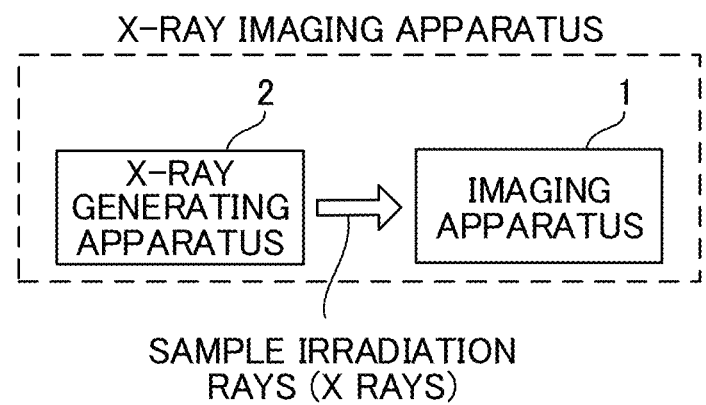
FIG. 18 is a diagram showing a configuration of an X-ray imaging apparatus according to a fifth practical example of the present invention.
Figure 19:
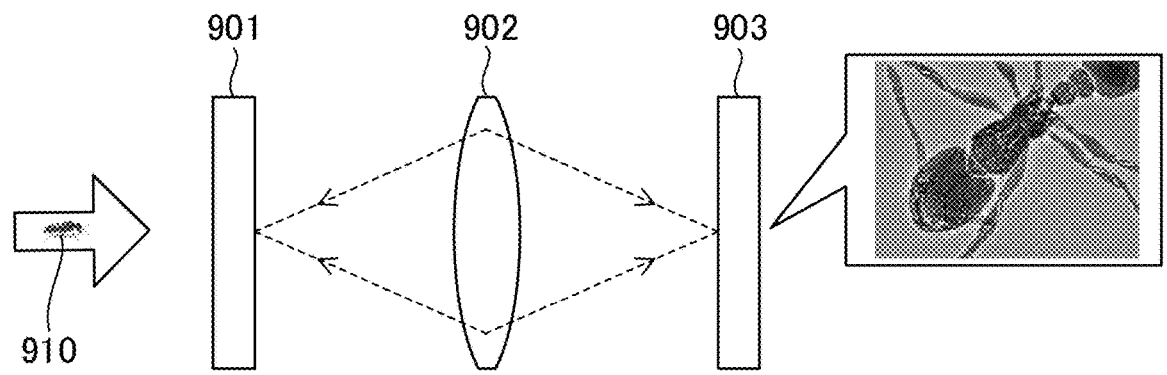
FIG. 19 is a diagram schematically showing a structure of an X-ray imaging apparatus employing a scintillator in connection with conventional technology.

A fifth practical example will be described. The sample irradiation rays and the incident rays 100 are radiation. Accordingly, the imaging apparatus 1 can be called a radiation imaging apparatus. Gamma rays, X rays, and ultraviolet rays (extreme ultraviolet rays in particular) belong to radiation. In a case where the sample irradiation rays and the incident rays 100 are X rays, the imaging apparatus 1 can be used in X-ray imaging, X-ray CT, X-ray topography, X-ray imaging microscopes, etc. As shown in FIG. 18, it is possible to build an X-ray imaging apparatus provided with an X-ray generating apparatus 2 that generates X rays and an imaging apparatus 1. The X rays generated by the X-ray generating apparatus 2 are used as the sample irradiation rays.

<<Sixth Practical Example>>

A sixth practical example will be described. The above description generally assumes that the front lens is composed of a lens-form substrate and a fluorescent film. The fluorescent film, however, can also be considered not to be a component of the front lens. That is, it can be understood thus: the front lens is composed of a lens-form substrate, and a fluorescent film, which is not a component of the front lens, is bonded to the lens-form substrate.

<<Seventh Practical Example>>

A seventh practical example will be described. The imaging apparatus 1 as a radiation imaging apparatus includes an optical element for a radiation imaging apparatus. The optical element for a radiation imaging apparatus includes at least an objective lens 10. The entire imaging optical system including the objective lens 10 can be understood to correspond to the optical element for a radiation imaging apparatus. The optical element for a radiation imaging apparatus converts, with a scintillator (fluorescent film), incident rays 100 with a comparatively short wavelength WL1 to fluorescence light with a comparatively long wavelength WL2, and images an image with the fluorescence light on the imaging surface of an image sensor 30, with enlargement or reduction as necessary.

<<Overview of the Invention>>

To follow is an overview of the present invention.

An optical element $W_1$ for a radiation imaging apparatus according to one aspect of the present invention is an optical element for a radiation imaging apparatus that includes an objective lens (for example, 10) and that receives incident radiation. Here, a scintillator (for example, 13) that receives the radiation to emit fluorescence light with a longer wavelength than the radiation is provided on the incidence side of the objective lens unitarily with the objective lens.

With this structure, as compared with conventional dry and liquid-immersion objective lenses, it is possible to greatly increase the numerical aperture of the objective lens, and it is thus possible to detect (image) incident rays with higher spatial resolution.

Specifically, for example, in the optical element $W_1$ for a radiation imaging apparatus, preferably, a lens (for example, 11) that is included in the objective lens and with which the scintillator is provided unitarily is formed of such a solid optical material that the difference in index of refraction between the lens and the scintillator has a predetermined value or less.

This contributes to suppressing scattering, refraction, and reflection of the fluorescence light at the bonding interface between the lens and the scintillator.

For another example, the optical element $W_1$ for a radiation imaging apparatus preferably includes an imaging optical system that includes the objective lens and that images an image with the fluorescence light from the scintillator on an imaging sensor (for example, 30).

With this structure, it is possible to acquire an image with high spatial resolution from the image sensor.

For another example, in the optical element $W_1$ for a radiation imaging apparatus, preferably, the objective lens has, on the side of incidence of the radiation, a curved surface having a concave surface or a convex surface, and a curved image with the fluorescence light from the scintillator is formed on the curved surface. Preferably, the imaging optical system converts the curved image to an image on a flat surface and images this image on the image sensor.

For another example, in the optical element $W_1$ for a radiation imaging apparatus, preferably, the imaging optical system includes, in addition to the objective lens, an imaging lens. Preferably, the imaging lens is disposed at an adjustable position between the objective lens and the image sensor along the optical path from the scintillator, which generates the fluorescence light, to the image sensor so that, through adjustment of the position of the imaging lens, the image with the fluorescence light is brought into focus on the image sensor.

For another example, in the optical element $W_1$ for a radiation imaging apparatus, preferably, the specimen plane is set at the scintillator so that the working distance of the objective lens has a zero or negative value.

A radiation imaging apparatus $W_2$ according to another aspect of the present invention includes an image sensor and the optical element $W_1$ for a radiation imaging apparatus.

An X-ray imaging apparatus $W_3$ according to yet another aspect of the present invention includes an image sensor, the optical element $W_1$ for a radiation imaging apparatus, and an X-ray generating apparatus (for example, 2) that generates X rays as the radiation that the optical element $W_1$ for a radiation imaging apparatus receives.

The following is to be noted: a structure where a scintillator is provided on the incidence side of an objective lens unitarily with it corresponds to a state where the medium between the lens and the scintillator is filled by the substance of which the lens is formed. That is, the above structure of the optical element $W_1$ for a radiation imaging apparatus can be understood to be the following structure: in an optical element for a radiation imaging apparatus including a scintillator that receives incident radiation to emit fluorescence light with a longer wavelength than the radiation and an objective lens that is disposed in the stage subsequent to the scintillator, the gap between the scintillator and the objective lens is filled by such a solid optical material that the difference in index of refraction between the scintillator and the objective lens has a predetermined value (for example, 0.1%) or less. Such structures too are to be understood to belong to the optical element $W_1$ for a radiation imaging apparatus.

REFERENCE SIGNS LIST 1 imaging apparatus
10 objective lens
11, 11a-11g, 11A, 11P, 11Q front lens
12 non-front lens
13, 13a-13g, 13A, 13P, 13Q fluorescent film
14, 14a-14g, 14A, 14P, 14Q lens-form substrate
20 imaging lens
30 image sensor

The invention claimed is:

1. An optical element for a radiation imaging apparatus, the optical element including
a scintillator that receives a radiation to emit fluorescence light with a longer wavelength than the radiation and that is formed unitarily on a radiation incidence side substrate face of a lens-form substrate included in an objective lens, wherein the scintillator is made of:
a base material that is a solid optical material of which the lens-form substrate is formed; and
a predetermined additive.

2. The optical element for a radiation imaging apparatus according to claim 1, wherein
the lens-form substrate is formed of the solid optical material with an index of refraction of which a difference from an index of refraction of the scintillator formed unitarily on the radiation incidence side substrate face of the lens-form substrate is 0.1% or less.

3. The optical element for a radiation imaging apparatus according to claim 2, wherein
a material of the lens-form substrate and the base material of the scintillator are solid optical materials of an identical composition selected from the group consisting of $Lu_3AL_5O_{12}$, $Y_3Al_5O_{12}$, $Lu_2SiO_5$, $LuYSiO_5$, $LuYSiO_5$, $Gd_3Ga_5O_{12}$, $CdWO_4$, $Bi_4Ge_3O_{12}$, $Gd_2SiO_5$, $Gd_2O_2S$, $Y_2SiO_5$, $Yb_2SiO_5$, $YAlO_3$, $LuAlO_3$, $Gd_3Al_2Ga_3O_{12}$, $LaBr_3$, $CeBr_3$, $SrI_2$, $GdAlO_3$, $Cs_2HfCl_6$, $LiCaAlF_6$, $Lu_2O_3$.

4. A radiation imaging apparatus comprising:
an image sensor; and
the optical element according to claim 3.

5. An X-ray imaging apparatus comprising:
an image sensor;
the optical element according to claim 3; and
an X-ray generating apparatus that generates X rays as the radiation that the optical element for a radiation imaging apparatus receives.

6. A radiation imaging apparatus comprising:
an image sensor; and
the optical element according to claim 2.

7. An X-ray imaging apparatus comprising:
an image sensor;
the optical element according to claim 2; and
an X-ray generating apparatus that generates X rays as the radiation that the optical element for a radiation imaging apparatus receives.

8. A radiation imaging apparatus comprising:
an image sensor; and
the optical element according to claim 1.

9. An X-ray imaging apparatus comprising:
an image sensor;
the optical element according to claim 1; and
an X-ray generating apparatus that generates X rays as the radiation that the optical element for a radiation imaging apparatus receives.

10. A method of manufacturing an optical element for a radiation imaging apparatus, the optical clement radiation imaging apparatus including an objective lens, the method comprising:
preparing a raw substrate formed of a solid optical material of which a lens is formed;
preparing a fluorescent plate formed of a material that uses, as a base material, a solid optical material substantially identical with the solid optical material of the raw substrate and that has a predetermined additive added to the base material;
bonding the fluorescent plate unitarily to a first face of the raw substrate and thereafter shaping a second face of the raw substrate into a form of a lens; and
fabricating, as a front lens of the objective lens, the optical element configured to have the fluorescent plate bonded unitarily on a radiation incidence side thereof.

11. The method of manufacturing an optical element for a radiation imaging apparatus according to claim 10, wherein
the fluorescent plate is bonded directly to the first face of the raw substrate by solid-phase diffusion, and
lens the second face of the raw substrate is shaped into a form of a convex lens.

12. A radiation imaging apparatus comprising:
a scintillator that receives radiation with a predetermined wavelength to emit fluorescence light with a longer wavelength than the radiation; and
a lens arranged in a stage subsequent to scintillator, wherein
the scintillator and the lens are made of a common base material and are bonded together directly as a single body, and
a difference in an index of refraction between the scintillator and the lens is 0.1% or less.

* * * * *